(12) United States Patent
Botchway et al.

(10) Patent No.: US 7,750,329 B2
(45) Date of Patent: Jul. 6, 2010

(54) OPTICAL TWEEZERS

(75) Inventors: Stanley Walter Botchway, East Hagbourne (GB); Andrew David Ward, Andover (GB); Renato Andrea Danilo Turchetta, Abingdon, Oxfordshire (GB); Mark Prydderch, Farringdon (GB); Michael Towrie, Wantage (GB)

(73) Assignee: The Science and Technology Facilities Council, Oxfordshire (GB)

( * ) Notice: Subject to any disclaimer, the term of this patent is extended or adjusted under 35 U.S.C. 154(b) by 578 days.

(21) Appl. No.: 11/658,026

(22) PCT Filed: Jul. 25, 2005

(86) PCT No.: PCT/GB2005/002917
§ 371 (c)(1), (2), (4) Date: Jan. 22, 2007

(87) PCT Pub. No.: WO2006/008553
PCT Pub. Date: Jan. 26, 2006

(65) Prior Publication Data
US 2008/0007731 A1  Jan. 10, 2008

(30) Foreign Application Priority Data
Jul. 23, 2004 (GB) ................. 0416496.8

(51) Int. Cl.
*G01B 5/28* (2006.01)
*G01B 15/00* (2006.01)

(52) U.S. Cl. ............... 250/559.05; 250/559.07; 73/105

(58) Field of Classification Search ........... 250/559.05, 250/559.07; 73/105
See application file for complete search history.

(56) References Cited

U.S. PATENT DOCUMENTS

| | | | |
|---|---|---|---|
| 5,445,011 A * | 8/1995 | Ghislain et al. | 250/307 |
| 6,180,940 B1 | 1/2001 | Galstian | |
| 6,624,940 B1 | 9/2003 | Grier et al. | |
| 6,626,546 B2 | 9/2003 | Grier et al. | |
| 6,677,566 B2 | 1/2004 | Knebel et al. | |
| 6,839,452 B1 * | 1/2005 | Yang et al. | 382/103 |

FOREIGN PATENT DOCUMENTS

| | | |
|---|---|---|
| WO | WO-01/38825 A1 | 5/2001 |
| WO | WO-03/053043 A | 6/2003 |

(Continued)

OTHER PUBLICATIONS

Bechhoefer J et al., The Institution of Electrical Engineers and American Journal of Physics American Assoc. Phys. Teachers through AIP USA, vol. 70, No. 4, Apr. 2002, pp. 393-400.

(Continued)

*Primary Examiner*—Seung C Sohn
(74) *Attorney, Agent, or Firm*—Birch, Stewart, Kolasch & Birch, LLP

(57) ABSTRACT

An imaging device using an array of active pixels, with a readout control for outputting from selected regions of interest is disclosed. When used to detect the positions of optically trapped objects, the fast readout rate enables fine control of the optical traps to stabilize the objects. Multiple objects can be controlled while being moved relative to each other.

21 Claims, 2 Drawing Sheets

FOREIGN PATENT DOCUMENTS

WO      WO-03-081899 A1      10/2003

OTHER PUBLICATIONS

Resnick Andrew, Review of Scientific Instruments, American Institute of Physics, vol. 72, No. 11, Nov. 2001, pp. 4059-4065.

Visscher K et al., IEEE Journal of Selected Topics in Quantum Electronics, IEEE Service Center, US, vol. 2, No. 4, Dec. 1, 1996, pp. 1066-1076.

Guilford et al. Analytical Biochemistry, vol. 326, pp. 153-166. (2004).

Gaiajda et al., American Institute of Physics, vol. 80, No. 24, pp. 4653-4655,( Jun. 17, 2002).

McGloin et al., Optics Communications, vol. 225, pp. 215-222, (2003).

Juodkazis et al., American Institute of Physics, vol. 82, No. 26, pp. 4657-4659 (Jun. 30, 2003).

Leake et al., FEBS Letters, vol. 535, pp. 55-60, (2003).

Kuyper et al., Department of Chemistry, vol. 56, No. 11, pp. 300A-312A, (2002).

Leckband, Annu. Rev. Biophys. Struct., vol. 29, pp. 1-26, (2000).

Prentice et al., Optics Express, vol. 12, No. 4, pp. 593-600, (Feb. 23, 2004).

Sun et al., Optical Society of America, vol. 8, No. 10, pp. 1483-1489, (Oct. 2001).

\* cited by examiner

OPTICAL TWEEZERS

The present invention relates to an imaging device, which is particularly well-suited to the imaging and tracking of optically trapped objects.

BACKGROUND OF THE INVENTION

Optical trapping may be used to catch and hold small particles (micron size and smaller) for study, and has proven extremely useful in the study of biological samples, including viruses, bacteria, living cells and organelles. Once trapped, the object may be imaged using a CCD array. However, a CCD array is unable to respond to the relatively rapid and random Brownian motion of the object within the trap. Accordingly, quadrant photodiodes with MHz readout rates are generally employed when monitoring the position of an object held within an optical trap.

There are several known methods for monitoring the position of an object within an optical trap. A popular method is to collect forward- or back-scattered light, from either the trapping beam or a secondary light source, with a condenser lens, the back focal plane of which is projected onto a quadrant photodiode. Lateral displacement of the optically trapped object is monitored by comparing the signals of pairs of quadrant diodes (e.g. a comparison of the top two and bottom two diodes provides information regarding vertical motion), whilst axial displacement is monitored through changes in the sum of the diode signals.

A fundamental problem with quadrant photodiodes is that they are suitable only for measuring the lateral and axial displacement of geometrically simple objects, and in particular spherical objects. For objects having irregular shapes, it is generally impossible using quadrant photodiodes to decouple lateral and axial displacements. To this end, many samples are first attached to a spherical bead, which is then held in the optical trap.

Additionally, quadrant photodiodes are impractical when monitoring multiple trapped objects using standard incoherent illumination since this requires undesirable splitting of the imaging light as well as the means to accurately move the relative positions of the quadrant arrays. In particular, when an object is held within a moving trap, the movement of the quadrant array must be precisely correlated with that of the moving trap, otherwise the measured position of the object within the moving trap will be inaccurate.

A sizeable CCD array can, of course, image irregular shaped objects and track the movement of an object without necessarily moving the array. However, owing to the relatively slow readout speeds, the CCD array is unable to discern Brownian motion. Consequently, the resulting thermal noise makes the CCD array unsuitable for many applications, including sensitive force measurements.

BRIEF SUMMARY OF THE INVENTION

There is therefore a need for an imaging device capable of imaging optically trapped objects having irregular shapes at speeds capable of resolving most thermal noise. Additionally, there is a need for an imaging device capable of imaging multiple objects without splitting the imaging light, as well as imaging objects held in moving traps without needing to move the imaging device, again at speeds capable of resolving most thermal noise. It is an object of the present invention to provide an imaging device that overcomes one or more of the aforementioned disadvantages of the prior art.

Accordingly, in a first aspect the present invention provides an imaging device comprising: an image sensor for collecting light scattered or emitted by one or more objects, the image sensor comprising an array of active pixels, a readout control for reading the outputs of a selected portion of the total number of active pixels, and a controller in communication with the readout control adapted to select the active pixels, to be addressed by the readout control wherein the selected active pixels are addressed by the readout control at rate of at least 1 kHz, and preferably at least 10 kHz.

In employing an active pixel the need for charge transfer is eliminated and therefore the imaging device is capable of higher readout rates than that of a CCD array. Moreover, in reading only a select number of pixels, the imaging device is able to provide novel image data not possible with conventional quadrant photodiodes at speeds capable of discerning most, if not all, Brownian motion. Additionally, in reading only a select number of pixels, the imaging device is able to image several objects simultaneously at high speed.

The number and arrangement of the pixels that are selectively read will depend upon the object being imaged as well as the information that is sought. For example, a circular ring of pixels may be used to measure changes in the edge of a spherical object to provide information regarding axial displacement of the object.

The imaging device may include elements for optically trapping the object to be imaged, i.e. a laser source and optical elements (lenses, mirrors etc) for focussing light from the laser source to create an optical trap at the spatial position of the object. The image sensor may collect light from the laser traps that has been scattered by the object. Alternatively, the imaging device may include a further coherent or incoherent light source to illuminate the object and the image sensor collects scattered light from this further light source.

As the optical trap is moved, the imaging device is able to image the object held within the trap without the need to physically move the image sensor. The pixels selectively read by the readout means are grouped into regions-of-interest, each region-of-interest being responsible for imaging a particular object. As the optical trap holding a particular object moves, the position of the region-of-interest also moves to track the trapped object.

The imaging device may further include means for controlling the position of the optical trap, e.g. acousto-optic deflectors, opto-mechanical deflectors or spatial light modulators. The readout means and the means for controlling the optical traps may then be arranged in feedback such that image data acquired by the readout means may be used to control the position of the optical traps. By operating at feedback rates of higher than about 10 kHz (0.1 ms period), not only can the vast majority of Brownian motion be discerned but the Brownian displacement of the trapped object may be quickly counteracted by immediately repositioning the optical trap to pull the object back to its desired position.

Any of the features set out above may also be used in an apparatus comprising a trap generator for generating and controlling one or more optical traps in a sample space;

an array of active pixels arranged to detect movement of one or more objects within the sample space; and a readout control adapted to read one or more selected subsets of the active pixels at a rate of at least 1 kHz, and preferably at least 10 kHz.

In a second aspect, the present invention provides a method of imaging one or more objects comprising the steps of: collecting light scattered or emitted by the objects with an active pixel sensor comprising an array of active pixels, selecting a portion of the total number of active pixels;

addressing the selected portion of active pixels; and repeating the addressing of a selected portion of the active pixel sensor at a rate of at least 1 kHz (1.0 ms readout period), and preferably at least 10 kHz.

BRIEF DESCRIPTION OF THE DRAWINGS

Embodiments of the present invention will now be described by way of example with reference to the accompanying drawings, in which.

DETAILED DESCRIPTION OF THE INVENTION

Figure 1:
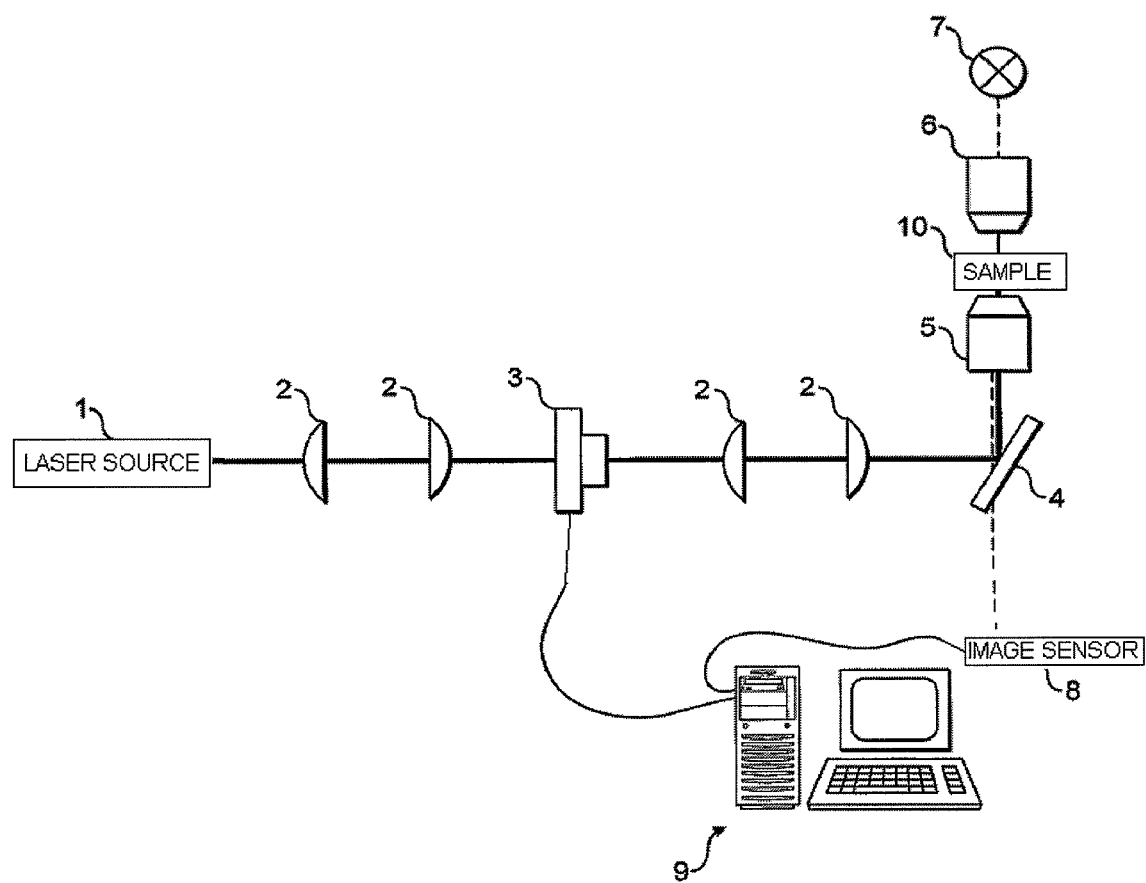
FIG. 1 illustrates an imaging device in accordance with the present invention.

FIG. 1 illustrates an imaging device that optically traps and images a sample 10. The device includes a laser source 1, focussing and collimating lenses 2, acousto-optic deflectors (AODs) 3, a dichroic mirror 4, a first objective lens 5, a second objective lens 6, an illumination source 7, an image sensor 8, and a computer 9 in communication with both the AOD 2 and the image sensor 8.

Light from the laser source 1 is collimated by the focussing and collimating lenses 2, and the collimated beam is focussed by the first objective lens 5 to form an optical trap at the sample 10. This arrangement may be referred to as a trap generator. The laser source 1 is preferably a continuous wave laser having a wavelength output in the near infrared such as Nd:YAG, diode lasers and titanium sapphire lasers. Biological samples generally have poor adsorption characteristics in the infrared. Consequently, lasers having infrared wavelengths are preferred in order to minimise localised heating and potential damage of the trapped sample. The power of the laser will, of course, depend upon the nature of the sample being trapped and should ideally be strong enough such that trapped sample cannot escape due to Brownian motion or escape when the sample is pulled by the optical trap through the surrounding medium.

The AODs 3 are used to control the position of the optical trap formed at the sample. Additionally, the AODs are used to create multiple traps by rapidly moving the laser light between two or more sites, i.e. by time-dividing the laser light with the dwell time at each optical trap preferably being around 50 µs. The response time of an AOD, which is dependent upon the time for an acoustic wave to propagate across the AOD, is typically around 1 µs and therefore the AODs are able to time-divide the laser light across several trapping sites without unacceptable loss of trap stiffness. A preferred method of creating multiple optical traps is described in a paper by Guildford et al, entitled "Creating multiple time-shared laser traps with simultaneous displacement detection using digital signal processing hardware" Analytical Biochemistry 326 (2004) 153 166, the contents of which is incorporated herein by reference.

Spatial light modulators (SLMs) may be used as an alternative to AODs. The laser light is spatially-divided rather than time-divided, the intensity of the laser light at each trapping site is a fraction of the total laser power. However, SLM technology currently remains too slow to provide fast feedback at 10 kHz. As a further alternative, multiple laser sources may be used to provide multiple traps, each laser source having AODs or opto-mechanical deflectors (e.g. steerable mirrors) for controlling the position of the trap.

Whilst the light of the laser source 1 is used to form optical traps, the light of the illumination source 7 is used to illuminate and image the sample 10 onto the image sensor 8. Light from the illumination source 7 is forward-scattered by the sample 10 and imaged onto the image sensor 8 by the first objective lens 5, which acts as a condenser lens for the scattered light. As the image sensor 8 collects scattered light of the illumination source 7 rather than the scattered light of the optical traps, it is not necessary that the objects imaged by the sensor 8 are held within optical traps. For example, a DNA strand may be tethered and stretched between two trapped polystyrene beads. One of the beads may then be released from the trap but nevertheless tracked so to obtain information regarding the elasticity of the strand.

The image sensor 8 takes the form of an active pixel sensor (APS) comprising a 512×512 array of directly-addressable, active pixels, each pixel being 25×25 µm in size. In employing an APS, the need for charge transfer is eliminated and therefore the imaging sensor is capable of higher readout rates than that of a CCD array. The size of the individual pixels, as well as the number of pixels and their arrangement in the array may be varied according to the particular application. It is envisaged that different formats may be used for the image sensor 8.

In the preferred embodiment, each active pixel has an analogue-to-digital converter (ADC) of at least 10 bit resolution, more preferably 16 bit resolution, and a readout rate of at least 10 kHz. In order to adequately resolve shot noise, each pixel sensor preferably has a well depth of around 400,000 $e^-$. Should less shot noise be required, the effective well depth of the pixel may be increased or additional capacitance may be provided near the well at the cost of increased readout noise. The resolution of the ADC may of course be increased to better resolve shot noise. However, the readout rate of the image sensor 8 naturally decreases with increasing ADC resolution. Alternatively, each pixel may have less than 10 bit resolution and the image sensor 8 over-samples the imaged object. Neighbouring pixels are then binned to achieve greater than 10 bit resolution. The ADC may be located on the chip or off the chip or on-pixel, as required, thus allowing selection between off-chip, on-chip, column-parallel or on-pixel ADC.

The image sensor 8 is controlled and readout by the computer 9 to provide image data of the sample 10. In employing, an array of directly addressable active pixels, in each addressing cycle the signals from only a group of selected active pixels (less than the total number of available pixels) may be readout without the need to readout the entire sensor array. As is discussed in greater detail below, this feature enables objects within the field-of-view of the second objective lens 6 to be selectively imaged at much higher speeds.

The computer 9 also controls the AODs so as to control the number and location of the optical traps. The image data acquired by the computer 9 from the image sensor 8 may be used in feedback to control the AODs and therefore the position of the optical traps. Accordingly, should a trapped object stray from its trapping position, the computer 9 includes programming to analyse the sensor images and to determine all necessary corrections to the optical trap positions. This information is then immediately communicated to the AODs so that an optical trap can be quickly repositioned to pull its trapped object back to the desired trapping position.

The imaging device may be operated in one of two modes: VDU mode and tracking mode. In VDU mode, all pixel sensors of the image sensor 8 are readout by the computer 9 and the image sensor 8 acts as a conventional CMOS camera. Whilst in VDU mode, objective lenses of increasing magnification can be used to visually position the sample 10 prior to optical trapping. Once the sample is optically trapped, the imaging device is switched to tracking mode. In tracking mode, the imaging device tracks the position of a selected number of objects within the field-of-view of the second objective lens 6. This is achieved by reading the outputs from only selected pixels of the image sensor 8 in each addressing cycle. As a result, the speed at which image data is collected by the computer 9 is much faster in tracking mode than in VDU mode. In VDU mode, image data from all pixel sensors may be acquired at video rates every 40 ms. In tracking mode, however, image data is acquired at speeds of at least 10 kHz (corresponding to a readout period of 0.1 ms).

The layout of the imaging device of FIG. 1 is provided by way of example only and alternative arrangements are of course possible. In the device of FIG. 1, light from the illumination source 7 is used to image the sample 10. This arrangement has the advantage that non-trapped objects may be imaged and tracked by the imaging device. However, the laser light used to the trap the sample may alternatively be used to image the sample. Additionally, the imaging device may be configured such that the image sensor 8 collects back-scattered rather than forward-scattered light.

Reference shall now be made to the imaging device, and in particular the image sensor 8, when operating in tracking mode. In tracking mode, the computer 9 selectively reads only those pixels corresponding to a 'region-of-interest' (ROI). Each ROI is responsible for imaging a particular object within the field-of-view. By reading only a portion of the total number of pixels available in an addressing cycle, the readout rate of the image sensor 8 is much faster than that if all pixels were readout. Accordingly, by employing regions-of-interest (ROIs), the image sensor 8 is able to image multiple objects simultaneously at relatively high speeds.

The regions-of-interest (ROIs) may be configured to have different sizes and shapes accordingly to the required application. An obvious example of this is when objects of different sizes and/or shapes are being imaged or tracked. The number and sizes of the ROIs will determine the speed at which image data is collected. For APSs having a readout rate of between 10 and 20 kHz, the image data of six ROIs, each ROI covering around 36 pixels, may read at speeds of at least 10 kHz (corresponding to a readout period of 0.1 ms). It is clear that there are trade-offs between the shape of the ROI, their number, number of pixels in each ROI and readout resolution. Higher resolution, i.e. higher number of bits per pixel, usually requires a slower readout rate. Higher number of pixels or of ROIs also slow down the system. Different shapes would also require different readout times for the same number of pixels. For example, if the readout is based on a column-parallel concept, reading out pixels on the same row is faster than reading out pixels on the same column.

Figure 2:
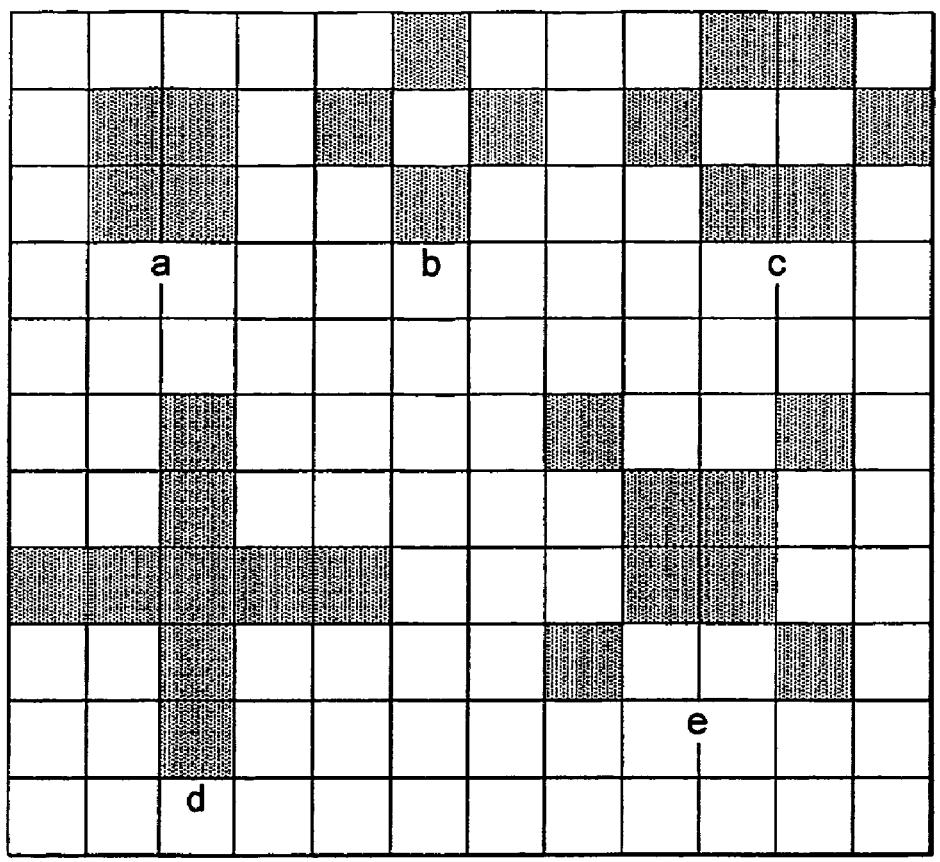
FIG. 2 illustrates example pixel groups, referred to as 'regions-of-interest', that are selectively read by the imaging device of the present invention when operating in tracking mode.

FIG. 2 illustrates ROIs having different shapes and sizes. FIG. 2a represents the conventional quadrant arrangement, which is particularly well-suited for measuring lateral movement of an object. FIGS. 2b and 2c, on the other hand, are intended to measure only the edge of the object. Accordingly, edge effects may be more sensitively measured, which is of particular importance in measuring axial movement of an object. When a transparent object having a different refractive index to the surrounding medium is displaced along the optical axis, a Becke line or halo is observed at the edge of the object. By employing a ROI that measures only changes in the edge of an object, axial displacement may be more accurately measured than that presently possible with quadrant photodiodes. This is also true for opaque objects where axial displacement is more sensitively measured as changes in contrast at the edge of an object. The ROI of FIG. 2b is intended to measure the edge effects of a spherical object, whilst that illustrated in FIG. 2c is intended to measure the edge effects of an elliptical object.

With a conventional quadrant photodiode, it can prove extremely difficult or indeed impossible to uncouple rotational movement from lateral movement. However, by employing ROIs of varying shapes and sizes, rotational, lateral and axial movement of an object as well as change in shape may be accurately tracked.

The initial shape, size and position of each ROI may be manipulated visually by computer control during VDU mode before the imaging device enters tracking mode. Once in tracking mode, the shape, size and position of each ROI may also vary. For example, the shape of the ROI responsible for tracking a particular object may flip alternatively between that of FIG. 2a and that of FIG. 2b to measure respectively the lateral and axial position of the object.

In addition to accurately tracking the position of objects having various shapes and sizes, the image sensor 8 of the present invention is also able to track an object, or indeed multiple objects, held within a moving trap without the need to physically move the image sensor 8. Accurate tracking of an object within a moving trap is important for many applications, particularly force microscopy in which a moving object is brought into contact or near-contact with another object. With a conventional quadrant photodiode detector, unless coherent interferometric techniques such as those employed by Guilford are used, the movement of the detector must precisely mirror that of the optical trap, otherwise the measured position of the object within the moving trap will be inaccurate. With the image sensor 8 of the present invention, however, the position of the object within the moving trap may be smooth tracked by moving the position ROI, thereby obviating the need to physically move the image sensor 8.

Figure 3:
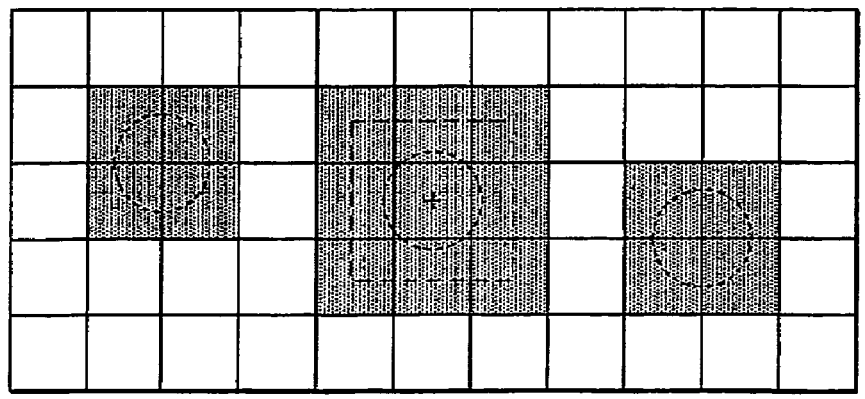
FIG. 3 illustrates the steps involved in the tracking of an object held in a moving optical trap by the imaging device of the present invention.

FIG. 3 illustrates an object being pulled diagonally downward and to the right by its optical trap; the pixels of the ROI are highlighted in black whilst the position of the trapped object is indicated by a dotted line. For the sake of simplicity, the ROI represents a quadrant configuration. Before the optical trap is moved by the computer 9, which controls the AODs 3, the ROI is expanded in the direction of movement. In this case, the ROI is expanded from 2×2 pixels to 3×3 pixels, the additional row and column of pixels being respectively below and to the right of the original ROI. The signals from all nine pixels are used to obtain the position of the trapped object. To decouple the motion of the object within the trap and the motion of the object due to the trap's movement, the signals of the individual pixels of the ROI are weighted according to the actual position of the optical trap. In order to weight each pixel, an imaginary ROI having a nominal size of 2×2 pixels is centred at the optical trap position and the fraction of each pixel which the imaginary ROI overlies is calculated. For example, in FIG. 3b the position of the optical trap lies at the centre of the centre pixel, as indicated by a cross; the imaginary ROI is indicated by a dashed line. The centre pixel therefore has a weighting of 1; the four pixels directly above, below, to the left and right of the centre pixel have a weighting of ½; and the four corner pixels each have a weighting of ¼. Once the optical trap has reached its final position, the ROI returns to its nominal size of 2×2 pixels. In this way, the position of an object held within a moving trap may be accurately and smoothly tracked without the need to move image sensor 8. Moreover, as the number of pixels making up the enlarged ROI remains relatively small, the high speeds of image data acquisition are maintained.

As mentioned earlier, the imaging device may operate in feedback mode, with the computer 9 controlling the AODs 3 in response to image data acquired by the imaging sensor 8. Through the use of ROIs, the imaging device of the present invention is able to monitor the position of several trapped objects at rates of at least 1 kHz (depending upon the number, shape and size of the ROIs), and typically at a rate of 10 kHz-20 kHz. The positional data obtained from the image sensor 8 is then used to provide rapid (preferably at 10 kHz rate or faster) feedback to the position of the optical trap. By operating at feedback rates of at least 1 kHz, and preferably higher than 10 kHz, Brownian displacement of the trapped object may be quickly counteracted by immediately repositioning the centre of the optical trap to pull the trapped object back to its original position. Feedback mode may also be used to provide, among other things, constant separation force measurements or simply a much stiffer trap.

As a result of the high rate at which ROIs can be imaged, the imaging device described above may also be used to image time resolved events including spectroscopic events, where the sampling of the ROIs are synchronised with external events/forces applied to the object being imaged, for example femtosecond or picosecond pulsed irradiation of the object.

The imaging device may be used in conjunction with a microprobe that can be held within an optical trap, such as that described in U.S. Pat. No. 5,445,011. The imaging device may then be used to measure the magnitude and direction of forces imparted on the microprobe. When operating in feedback, the microprobe can be moved towards ('hunter mode') or away from ('hunted mode') a sensed force. Alternatively, the microprobe can be controlled such that a constant force is maintained. If the sensed force derives from a charged particle, the imaging device and microprobe (which may carry a static charge) may be used to manipulate the particle without direct contact by the microprobe or by optically trapping the particle. At present this is not possible with quadrant photodiodes or conventional imagers since neither detector is able to track particles in a wide optical field or manoeuvre them with respect to one another at speeds fast enough to provide stable tracking.

The imaging device may operate in 'guard mode', whereby the image sensor 8 continually monitors the field-of-view for foreign particles. This can be achieved by occasionally entering VDU mode such that a complete image of the field-of-view is generated. Alternatively, a ROI of appropriate size (e.g. an entire row or column of pixels, or a window of say 4×4 pixels) may scan across the image sensor to image the entire field-of-view. Once a foreign particle is identified, the particle is removed from the field-of-view by optical trapping or, if the particle cannot be optically trapped, by a microtool that is controllable by optical trapping (e.g. a pair of glass beads which can be used as tweezers).

Owing to the fast readout rates of the image sensor 8 in employing ROIs, the imaging device is able to rapidly detect and capture (e.g. by optical trapping or by optically controllable microtools) fast moving particles entering the field-of-view and to sort the particles by type, size, shape, mass etc. Accordingly, the imaging device has applications in, among other things, environmental sensing, product control and cell sorting.

As the image sensor 8 is able to monitor directly or indirectly light scattered, absorbed or emitted by an object, the present invention is able to monitor in real-time a sample undergoing some form of physical change, e.g. a material phase change, or change in chemistry etc. Additionally, the fast readout of the image sensor 8 enables interferometric tomography at the nanometer to micron scale, and in particular applications employing FT-based interfermetric depth profiling and position measurements using both broadband incoherent light and narrowband and broadband coherent light.

By reading only a select number of pixel sensors, the imaging device of the present invention is able to image and track the lateral, axis and rotational movement of objects having irregular shapes at speeds capable of discerning Brownian motion. Moreover, in employing a relatively large array of pixel sensors, only some of which are readout at any one time, the imaging device is able to image and track several objects simultaneously at high speed and to smoothly track the position of objects within moving traps without the need to physically move the image sensor.

The speed of the imaging device, which is determined by the number, shapes and sizes of the ROIs as well as the readout rate of the individual pixel sensors, is limited predominantly by available data transfer rates and processing power. As data transfer rates and processing power increase, the number and sizes of the ROIs as well as the resolution of the individual sensors may also be increased.

Whilst the imaging device is particularly well-suited to imaging and tracking the positions of optically trapped objects, the device may be used to image any object within the field-of-view of the device at rates of 1 kHz, and preferably 10 kHz or faster.

The invention claimed is:

1. Apparatus comprising:
   a trap generator for generating and controlling one or more optical traps in a sample space;
   an array of active pixels arranged to detect movement of one or more objects within the sample space; and
   a readout control adapted to read one or more selected subsets of the active pixels at a rate of at least 1 kHz.

2. The apparatus of claim 1 further comprising a controller in communication with the readout control and adapted to select the one or more subsets of active pixels.

3. The apparatus of claim 2 wherein the controller is adapted to change the one or more subsets of active pixels in response to the movement of the one or more objects within the sample space.

4. The apparatus of claim 2 wherein the controller is adapted to change the one or more subsets of active pixels in response to changes in the control of the one or more optical traps.

5. The apparatus of claim 2, wherein the controller is configured to select the one or more subsets of active pixels in the form of predetermined patterns that correspond substantially in shape to cross-sectional profiles of the one or more objects.

6. The apparatus of claim 2, wherein the controller is configured to select the one or more subsets of active pixels in the form of predetermined patterns that correspond substantially in shape to edge profiles of the one or more objects.

7. The apparatus of claim 2, wherein the controller is additionally in communication with the trap generator, and wherein the controller is adapted to analyse the position of the optical traps and the data read by the readout control so as to generate correctional adjustments to the trap generator.

8. The apparatus of claim 7, wherein the controller is adapted to provide feedback control data to the trap generator.

9. The apparatus of claim 1 adapted to hold the one or more objects within the one or more optical traps.

10. The apparatus of claim 1, wherein the readout control is adapted to read the one or more selected subsets of the active pixels at a rate of at least 10 kHz.

11. The apparatus of claim 1, further comprising a light source for illuminating the one or more objects and an image sensor for collecting illuminating light scattered by the one or more objects.

12. The apparatus of claim 1, wherein the trap generator comprises a laser source and one or more optical elements for focussing light from the laser source to generate the one or more optical traps.

13. A method of imaging one or more objects comprising the steps of:
- generating one or more optical traps in a sample space;
- optically trapping the one or more objects to be imaged within the one or more optical traps;
- collecting light scattered or emitted by the one or more objects with an array of active pixels;
- selecting a subset of active pixels;
- addressing the selected subset of active pixels; and
- repeating the addressing of a selected subset of active pixels at a rate of at least 1 kHz.

14. The method of claim 13 wherein the repeat addressing is at a rate of at least 10 kHz.

15. The method of claim 13, wherein the selected subset of active pixels form patterns that correspond substantially in shape to cross-sectional profiles of the one or more objects.

16. The method of claim 13, where the selected subset of active pixels forms patterns that correspond substantially in shape to edge profiles of the one or more objects.

17. The method of claim 13, wherein the selected subset of active pixels that are addressed changes for subsequent addressing cycles to form changing patterns.

18. The method of claim 13, further comprising the step of illuminating the one or more objects such that the array of active pixels collects illuminating light scattered by the one or more objects.

19. The method of claim 13, further comprising the step of repositioning one or more of the one or more optical traps.

20. The method of claim 19, wherein the collected light data is used in the repositioning of the one or more optical traps.

21. The method of claim 13, further comprising the step of analysing the position of the one or more optical traps and the collected light data to provide positional data of the one or more objects held within the one or more optical traps.

* * * * *